United States Patent
Ssubramaniam et al.

(10) Patent No.: US 11,193,009 B2
(45) Date of Patent: Dec. 7, 2021

(54) MODIFIED POLYETHYLENE COMPOSITIONS AND METHOD FOR MAKING THE SAME

(71) Applicants: Dow Global Technologies LLC, Midland, MI (US); PBBPolisur S.R.L., Buenos Aires (AR)

(72) Inventors: Surya Ssubramaniam, Richmond, VA (US); Mehmet Demirors, Pearland, TX (US); Teresa P. Karjala, Lake Jackson, TX (US); Jorge C. Gomes, Sao Paulo (BR); Guillermo A. Raimondi, Buenos Aires (AR); Davidson Lütkenhaus, Sao Paulo (BR); Marie De Luján Tricotti, Buenos Aires (AR)

(73) Assignees: Dow Global Technologies LLC, Midland, MI (US); PBBPolisur S.R.L., Buenos Aires (AR)

( * ) Notice: Subject to any disclaimer, the term of this patent is extended or adjusted under 35 U.S.C. 154(b) by 0 days.

(21) Appl. No.: 16/639,620

(22) PCT Filed: Sep. 14, 2018

(86) PCT No.: PCT/US2018/051151
§ 371 (c)(1),
(2) Date: Feb. 17, 2020

(87) PCT Pub. No.: WO2019/067239
PCT Pub. Date: Apr. 4, 2019

(65) Prior Publication Data
US 2020/0239673 A1 Jul. 30, 2020

Related U.S. Application Data

(60) Provisional application No. 62/563,872, filed on Sep. 27, 2017.

(51) Int. Cl.
| | |
|---|---|
| *C08J 5/18* | (2006.01) |
| *C08L 23/08* | (2006.01) |
| *C08K 5/00* | (2006.01) |
| *C08K 5/14* | (2006.01) |
| *C08L 23/06* | (2006.01) |

(52) U.S. Cl.
CPC ............. *C08L 23/0815* (2013.01); *C08J 5/18* (2013.01); *C08K 5/005* (2013.01); *C08K 5/14* (2013.01); *C08L 23/06* (2013.01); *C08J 2323/08* (2013.01); *C08L 2203/16* (2013.01); *C08L 2205/02* (2013.01); *C08L 2207/066* (2013.01); *C08L 2310/00* (2013.01)

(58) Field of Classification Search
USPC .................. 525/232, 240; 428/218, 220
See application file for complete search history.

(56) References Cited

U.S. PATENT DOCUMENTS

| | | |
|---|---|---|
| 3,003,000 A | 10/1961 | Milas |
| 3,645,992 A | 2/1972 | Elston |
| 3,914,342 A | 10/1975 | Mitchell |
| 4,076,698 A | 2/1978 | Anderson et al. |
| 4,599,392 A | 7/1986 | McKinney et al. |
| 4,614,764 A | 9/1986 | Colombo et al. |
| 5,272,236 A | 12/1993 | Lai et al. |
| 5,278,272 A | 1/1994 | Lai et al. |
| 5,292,845 A | 3/1994 | Kawasaki et al. |
| 5,582,923 A | 12/1996 | Kale et al. |
| 5,733,155 A | 3/1998 | Sagawa et al. |
| 5,854,045 A | 12/1998 | Fang et al. |
| 7,498,282 B2 | 3/2009 | Patel et al. |
| 7,776,987 B2 | 8/2010 | Oswald et al. |
| 7,812,094 B2 | 10/2010 | Kvamme et al. |
| 8,372,931 B2 | 2/2013 | Hermel-Davidock et al. |

(Continued)

FOREIGN PATENT DOCUMENTS

| | | |
|---|---|---|
| EP | 2653392 B1 | 10/2015 |
| JP | 2010144134 A | 7/2010 |

(Continued)

OTHER PUBLICATIONS

Williams and Ward, J. Polym. Sci., Polym. Let., 1968, pp. 621-624, vol. 6.
Randall, Rev. Macromol. Chem. Phys., 1989, pp. 201-317, C29.
Monrabal, et al., Macromol. Symp., 2007, pp. 71-79, vol. 257.
Milas and Golubovic, J. Am. Chem. Soc, 1959, pp. 5824-5826, vol. 81.
PCT/US2018/051151, International Search Report and Written Opinion dated Nov. 26, 2018.
PCT/US2018/051151, International Preliminary Report on Patentability dated Mar. 31, 2020.

*Primary Examiner* — Terressa Boykin

(57) ABSTRACT

Provided is a method for increasing the melt strength and/or low shear viscosity of a polyethylene resin. The method includes: a) providing a polyethylene composition including the reaction product of ethylene and optionally, one or more alpha-olefin comonomers, wherein the polyethylene composition is characterized by the following properties: a density ranging from 0.900 g/cm$^3$ to 0.970 g/cm$^3$, a molecular weight distribution (Mw/Mn) ranging from 2.6 to 3.5, and from 0.10 to 0.27 vinyl groups per 1,000 total carbon atoms; b) providing a masterbatch composition including a free radical generator and a polyethylene resin, wherein the free radical generator has a half-life at 220° C. of less than 200 seconds, and a decomposition energy higher than −250 kJ/mol, and wherein the polyethylene resin has a density ranging from 0.900 g/cm$^3$ to 0.970 g/cm$^3$, melt index ranging from 0.01 g/10 min to 100 g/10 min; and c) reacting the polyethylene composition with the masterbatch composition to form a modified polyethylene composition.

16 Claims, No Drawings

(56) References Cited

U.S. PATENT DOCUMENTS

| | | | |
|---|---|---|---|
| 8,889,794 B2 | 11/2014 | Wang | |
| 8,916,667 B2 | 12/2014 | Karjala et al. | |
| 8,987,382 B2 | 3/2015 | Demirors et al. | |
| 9,068,032 B2 | 6/2015 | Karjala et al. | |
| 9,422,425 B2 | 8/2016 | Karjala et al. | |
| 9,428,636 B2 | 8/2016 | Effler et al. | |
| 9,803,295 B2 | 10/2017 | Patel et al. | |
| 2004/0054097 A1 | 3/2004 | Maehling et al. | |
| 2011/0171407 A1 | 7/2011 | Mazzola et al. | |
| 2014/0255674 A1 | 9/2014 | Tice et al. | |
| 2016/0237222 A1 | 8/2016 | Demirors et al. | |
| 2016/0272798 A1* | 9/2016 | Cheng | C08L 23/0815 |
| 2019/0100644 A1 | 4/2019 | Williamson et al. | |

FOREIGN PATENT DOCUMENTS

| | | |
|---|---|---|
| WO | 1993/003093 | 2/1993 |
| WO | 2011/085377 A1 | 7/2011 |
| WO | 2011085371 A1 | 7/2011 |
| WO | 2013006409 A1 | 1/2013 |

\* cited by examiner

MODIFIED POLYETHYLENE COMPOSITIONS AND METHOD FOR MAKING THE SAME

TECHNICAL FIELD

Embodiments of the present disclosure generally relate to methods of manufacturing modified polyethylene compositions having increased melt strength and/or low shear viscosity.

BACKGROUND

Polyethylene resins are used in many applications requiring good physical properties, easy processing, and sufficient melt strength and/or shrink tension for formation of films or blow molded articles. Linear Low Density Polyethylene (LLDPE) has very desirable physical properties, but may lack sufficient melt strength and/or shrink tension to be used in certain film applications, such as, large bubble films, collation shrink films, or in blow molding applications, pipe applications, and extrusion coating applications. In many applications, a blend of LLDPE with LDPE is used to increase the LLDPE melt strength during processing and/or shrink tension of resultant films. Alternatively, LLDPE melt strength may be increased by increasing the molecular weight of the LLDPE. Such solutions, however, can present challenges. For example, LLDPE with high molecular weight can cause high extrusion pressure, thereby lowering extrusion output and potentially causing melt fracture. A typical solution may be to add an amount of LDPE, varying from 20 to 60% depending on the application requirements, to improve process stability; however, the addition of LDPE can cause a significant drop in the mechanical properties, such as, tear, puncture, and dart impact resistance.

Accordingly, alternative methods for producing polyethylene compositions having increased melt strength and/or low shear viscosity are desired.

SUMMARY

Disclosed in embodiments herein are methods for increasing the melt strength and/or low shear viscosity of a polyethylene composition. The methods comprise: a) providing a polyethylene composition comprising the reaction product of ethylene and optionally, one or more alpha-olefin comonomers, wherein the polyethylene composition is characterized by the following properties: a density ranging from 0.900 g/cm$^3$ to 0.970 g/cm$^3$, a molecular weight distribution (Mw/Mn) ranging from 2.6 to 3.5, and from 0.10 to 0.27 vinyl groups per 1,000 total carbon atoms; b) providing a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density ranging from 0.900 g/cm$^3$ to 0.970 g/cm$^3$, melt index ranging from 0.01 g/10 min to 100 g/10 min; and c) reacting the polyethylene composition with the masterbatch composition to form a modified polyethylene composition.

Also disclosed herein are compositions formed from the modified polyethylene compositions disclosed herein. The modified polyethylene composition are made by a) providing a polyethylene composition comprising the reaction product of ethylene and optionally, one or more alpha-olefin comonomers, wherein the polyethylene composition is characterized by the following properties: a density ranging from 0.900 g/cm$^3$ to 0.970 g/cm$^3$, a molecular weight distribution (Mw/Mn) ranging from 2.6 to 3.5, and from 0.10 to 0.27 vinyl groups per 1,000 total carbon atoms; b) providing a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density ranging from 0.900 g/cm$^3$ to 0.970 g/cm$^3$, melt index ranging from 0.01 g/10 min to 100 g/10 min; and c) reacting the polyethylene composition with the masterbatch composition to form the modified polyethylene composition.

Further disclosed herein are films or blow molded articles formed from the modified polyethylene compositions disclosed herein. The modified polyethylene compositions are made by a) providing a polyethylene composition comprising the reaction product of ethylene and optionally, one or more alpha-olefin comonomers, wherein the polyethylene composition is characterized by the following properties: a density ranging from 0.900 g/cm$^3$ to 0.970 g/cm$^3$, a molecular weight distribution (Mw/Mn) ranging from 2.6 to 3.5, and from 0.10 to 0.27 vinyl groups per 1,000 total carbon atoms; b) providing a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density ranging from 0.900 g/cm$^3$ to 0.970 g/cm$^3$, melt index ranging from 0.01 g/10 min to 100 g/10 min; and c) reacting the polyethylene composition with the masterbatch composition to form the modified polyethylene composition.

Additional features and advantages of the embodiments will be set forth in the detailed description which follows, and in part will be readily apparent to those skilled in the art from that description or recognized by practicing the embodiments described herein, including the detailed description. It is to be understood that both the foregoing and the following description describes various embodiments and are intended to provide an overview or framework for understanding the nature and character of the claimed subject matter.

DETAILED DESCRIPTION

Reference will now be made in detail to embodiments of increasing the melt strength and/or low shear viscosity of a polyethylene composition. The polyethylene compositions having increased melt strength may be used to form films. The films may be used in agricultural films, thermoformed films, and collation shrink applications. It is noted however, that this is merely an illustrative implementation of the embodiments disclosed herein. The embodiments are applicable to other technologies that are susceptible to similar problems as those discussed above. For example, the polyethylene compositions having increased melt strength may be used in blow molding applications, extrusion coating, and pipe applications, all of which are within the purview of the present embodiments.

In embodiments described herein, the method for increasing the melt strength and/or low shear viscosity of a polyethylene composition comprises: a) providing a polyethylene composition; b) providing a masterbatch composition comprising a free radical generator and a polyethylene resin; and b) reacting the polyethylene composition with the masterbatch composition to form a modified polyethylene composition.

Polyethylene Composition

In embodiments herein, the polyethylene composition comprises the reaction product of ethylene and, optionally, one or more alpha olefin comonomers. The polyethylene composition comprises greater than 50 wt. % of the units derived from ethylene and less than 30 wt. % of the units derived from one or more alpha-olefin comonomers. In some embodiments, the polyethylene composition comprises (a) greater than or equal to 55%, for example, greater than or equal to 60%, greater than or equal to 65%, greater than or equal to 70%, greater than or equal to 75%, greater than or equal to 80%, greater than or equal to 85%, greater than or equal to 90%, greater than or equal to 92%, greater than or equal to 95%, greater than or equal to 97%, greater than or equal to 98%, greater than or equal to 99%, greater than or equal to 99.5%, from greater than 50% to 99%, from greater than 50% to 97%, from greater than 50% to 94%, from greater than 50% to 90%, from 70% to 99.5%, from 70% to 99%, from 70% to 97% from 70% to 94%, from 80% to 99.5%, from 80% to 99%, from 80% to 97%, from 80% to 94%, from 80% to 90%, from 85% to 99.5%, from 85% to 99%, from 85% to 97%, from 88% to 99.9%, 88% to 99.7%, from 88% to 99.5%, from 88% to 99%, from 88% to 98%, from 88% to 97%, from 88% to 95%, from 88% to 94%, from 90% to 99.9%, from 90% to 99.5% from 90% to 99%, from 90% to 97%, from 90% to 95%, from 93% to 99.9%, from 93% to 99.5% from 93% to 99%, or from 93% to 97%, by weight, of the units derived from ethylene; and (b) optionally, less than 30 percent, for example, less than 25 percent, or less than 20 percent, less than 18%, less than 15%, less than 12%, less than 10%, less than 8%, less than 5%, less than 4%, less than 3%, less than 2%, less than 1%, from 0.1 to 20%, from 0.1 to 15%, 0.1 to 12%, 0.1 to 10%, 0.1 to 8%, 0.1 to 5%, 0.1 to 3%, 0.1 to 2%, 0.5 to 12%, 0.5 to 10%, 0.5 to 8%, 0.5 to 5%, 0.5 to 3%, 0.5 to 2.5%, 1 to 10%, 1 to 8%, 1 to 5%, 1 to 3%, 2 to 10%, 2 to 8%, 2 to 5%, 3.5 to 12%, 3.5 to 10%, 3.5 to 8%, 3.5% to 7%, or 4 to 12%, 4 to 10%, 4 to 8%, or 4 to 7%, by weight, of units derived from one or more a-olefin comonomers. The comonomer content may be measured using any suitable technique, such as techniques based on nuclear magnetic resonance ("NMR") spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. The one or more alpha-olefins may be selected from the group consisting of C3-C20 acetylenically unsaturated monomers and C4-C18 diolefins. Those skilled in the art will understand that the selected monomers are desirably those that do not destroy conventional Ziegler-Natta catalysts. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene. In some embodiments, the polyethylene composition comprises greater than 0 wt. % and less than 30 wt. % of units derived from one or more of octene, hexene, or butene comonomers.

In some embodiments, the polyethylene composition is formed in the presence of a catalyst composition comprising a multi-metallic procatalyst via solution polymerization in at least one reactor. The multi-metallic procatalyst used in producing the reaction product is at least trimetallic, but may also include more than three transition metals, and thus may in one embodiment be defined more comprehensively as multi-metallic. These three, or more, transition metals are selected prior to production of the catalyst. In a particular embodiment, the multi-metal catalyst comprises titanium as one element.

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.25 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., alternatively, 0° C. to 50° C.; a time ranging from 1 to 12 hours, alternatively, from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. The conditioning compound has a molar ratio constitution that is specific and which is believed to be an important feature in ensuring the desirable catalyst performance. Specifically, the procatalyst desirably exhibits a molar ratio of the magnesium to the conditioning compound that ranges from 3:1 to 6:1. Without wishing to be bound by any theory of mechanism, it is suggested that this aging serves to facilitate or enhance adsorption of additional metals onto the support.

Once the conditioned support is prepared and suitably aged, it is brought into contact with a titanium compound which may be added individually or as a mixture with the "second metal". In certain preferred embodiments titanium halides or alkoxides, or combinations thereof, may be selected. Conditions may include a temperature within the range from 0° C. to 50° C., alternatively from 25° C. to 35° C.; a time from 3 hours to 24 hours, alternatively from 6 hours to 12 hours; or both. The result of this step is adsorption of at least a portion of the titanium compound onto the conditioned magnesium halide support.

Finally, one or two additional metals, referred to herein as "the second metal" and "the third metal" for convenience, will also be adsorbed onto the magnesium-based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

In embodiments described herein, the polyethylene composition may have a metal catalyst residual of greater than or equal to 1 parts by combined weight of at least three metal residues per one million parts of polyethylene polymer, wherein the at least three metal residues are selected from the group consisting of titanium, zirconium, hafnium, vanadium, niobium, tantalum, chromium, molybdenum, tungsten, and combinations thereof, and wherein each of the at least three metal residues is present at greater than or equal to 0.2 ppm, for example, in the range of from 0.2 to 5 ppm. All individual values and subranges from greater than or equal to 0.2 ppm are included herein and disclosed herein; for example, the polyethylene composition may further comprise greater than or equal to 2 parts by combined weight of at least three metal residues remaining from the multi-metallic polymerization catalyst per one million parts of the polyethylene composition.

In some embodiments, the polyethylene composition comprises at least 0.75 ppm of V (Vanadium). All individual values and subranges from at least 0.75 ppm of V are included and disclosed herein; for example the lower limit of the V in the polyethylene composition may be 0.75, 1, 1.1, 1.2, 1.3 or 1.4 ppm to an upper limit of the V in the polyethylene composition may be 5, 4, 3, 2, 1.9, 1.8, 1.7, 1.6, 1.5, or 1 ppm. The vanadium catalyst metal residual concentration for the polyethylene composition can be measured using the Neutron Activation Method for Metals described below.

In some embodiments, the polyethylene composition comprises at least 0.3 ppm of Zr (Zirconium). All individual values and subranges of at least 0.3 ppm of Zr are included and disclosed herein; for example the lower limit of the Zr in the polyethylene composition may be 0.3, 0.4, 0.5, 0.6 or 0.7 ppm. In yet another embodiment, the upper limit of the Zr in the polyethylene composition may be 5, 4, 3, 2, 1, 0.9, 0.8 or 0.7 ppm. The zirconium catalyst metal residual concentration for the polyethylene composition can be measured using the Neutron Activation Method for Metals described below.

In embodiments described herein, the polyethylene composition has a density of 0.900 g/cc to 0.970 g/cc. All individual values and subranges of at least 0.900 g/cc to 0.970 g/cc are included and disclosed herein. For example, in some embodiments, the polyethylene has a density of from 0.905 g/cm$^3$ to 0.965 g/cm$^3$, 0.905 g/cm$^3$ to 0.960 g/cm$^3$, 0.907 g/cm$^3$ to 0.960 g/cm$^3$, 0.910 g/cm$^3$ to 0.955 g/cm$^3$, 0.910 g/cm$^3$ to 0.950 g/cm$^3$, 0.910 g/cm$^3$ to 0.947 g/cm$^3$, 0.910 g/cm$^3$ to 0.945 g/cm$^3$, 0.910 g/cm$^3$ to 0.9420 g/cm$^3$, or 0.910 g/cm$^3$ to 0.940 g/cm$^3$. Density may be measured in accordance with ASTM D792.

In addition to the density, the polyethylene composition has a molecular weight distribution (Mw/Mn) of from 2.6 to 3.5. All individual values and subranges of from 2.6 to 3.5 are included and disclosed herein. For example, in some embodiments, the polyethylene composition may have an Mw/Mn ratio from a lower limit of 2.6, 2.7, 2.8, or 3.0 to an upper limit of 3.5. In other embodiments, the polyethylene composition may have an Mw/Mn ratio of from 3.0 to 3.5. Molecular weight distribution can be described as the ratio of weight average molecular weight ($M_w$) to number average molecular weight ($M_n$) (i.e., $M_w/M_n$), and can be measured by gel permeation chromatography techniques.

In addition to the density and molecular weight distribution, the polyethylene composition has from 0.10 to 0.27 vinyl groups per 1,000 total carbon atoms. All individual values and subranges of from 0.10 to 0.27 vinyl groups per 1,000 total carbon atoms are included and disclosed herein. For example, in some embodiments, the polyethylene composition may have from 0.10 to 0.25 vinyl groups per 1,000 total carbon atoms. In some embodiments, the polyethylene composition may have from 0.10 to 0.20 vinyl groups per 1,000 total carbon atoms.

In addition to the density, molecular weight distribution, and vinyl groups, the polyethylene composition may have a melt index, I2, of 0.5 g/10 min to 7.0 g/10 min. All individual values and subranges of 0.5 g/10 min to 7.0 g/10 min are included and disclosed herein. For example, in some embodiments, the polyethylene composition may have a melt index, I2, of 0.7 g/10 min to 7.0 g/10 min or from 0.7 g/10 min to 1.5 g/10 min. Melt index, I2, may be measured in accordance with ASTM D1238 (190° C. and 2.16 kg).

In addition to the density, molecular weight distribution, vinyl groups, and melt index, I2, the polyethylene composition may have a melt flow ratio, I10/I2, of from 5.5 to 7.6. All individual values and subranges of from 5.5 to 7.6 are included and disclosed herein. For example, in some embodiments, the polyethylene composition may have a melt flow ratio, I10/I2, ranging from a lower limit of 6.5 to an upper limit of 7.6, 7.5, 7.3, 7.1, or 7.0. In other embodiments, the polyethylene composition may have a melt flow ratio, I10/I2, of from 6.5 to 7.5. Melt index, I10, may be measured in accordance with ASTM D1238 (190° C. and 10.0 kg).

In addition to the density, molecular weight distribution, vinyl groups, melt index, I2, and melt flow ratio, I10/I2, the polyethylene composition may have a composition distribution breadth index, CDBI, of less than 60%. All individual values and subranges of less than 60% are included and disclosed herein. For example, in some embodiments, the polyethylene composition may have a CDBI of from 37% to 60% or 40% to 60%.

The CDBI may be defined as the weight percent of the polymer molecules having a comonomer content within 50 percent of the median total molar comonomer content. The CDBI of linear polyethylene, which does not contain a comonomer, is defined to be 100%. The CDBI of a copolymer is readily calculated from data obtained from crystallization elution fractionation ("CEF") as described below. Unless otherwise indicated, terms such as "comonomer content", "average comonomer content" and the like refer to the bulk comonomer content of the indicated interpolymer blend, blend component, or fraction on a molar basis.

In addition to the density, molecular weight distribution, vinyl groups, melt index, I2, melt flow ratio, I10/I2, and CDBI, the polyethylene composition may have a number average molecular weight, Mn (g/mol), of from 20,000 to 50,000 g/mol. All individual values and subranges of from 20,000 to 50,000 g/mol are included and disclosed herein. For example, the polyethylene composition may have a Mn from 33,000 to 50,000 g/mol, 33,000 to 45,000 g/mol, or 33,000 to 40,000 g/mol.

In addition to the density, molecular weight distribution, vinyl groups, melt index, I2, melt flow ratio, I10/I2, CDBI, and number average molecular weight, the polyethylene composition may have a weight average molecular weight, Mw (g/mol), of from 90,000 to 130,000 g/mol. All individual values and subranges of from 90,000 to 130,000 g/mol are included and disclosed herein. For example, the polyethylene composition may have a Mw from 95,000 to 125,000 g/mol, 100,000 to 125,000 g/mol, or 110,000 to 120,000 g/mol.

In addition to the density, molecular weight distribution, vinyl groups, melt index, I2, melt flow ratio, I10/I2, CDBI, number average molecular weight, and weight average molecular weight, the polyethylene composition may have a z average molecular weight, Mz (g/mol), of from 200,000 to 350,000 g/mol. All individual values and subranges of from 200,000 to 350,000 g/mol are included and disclosed herein. For example, the polyethylene composition may have an Mz from 250,000 to 350,000, 275,000 to 350,000 g/mol, or 300,000 to 350,000 g/mol.

In some embodiments herein, the polyethylene composition may comprise less than 150 ppm of primary antioxidant. All individual values and subranges of less than 150 ppm of primary antioxidant are included and disclosed herein. For example, in some embodiments, the polyethylene composition may comprise less than 100 ppm, less than 75 ppm, less than 50 ppm, less than 25 ppm, or 0 ppm of primary antioxidant. In other embodiments herein, the polyethylene composition may comprise from a 0 ppm to 100 ppm, 10 ppm to 100 ppm, 10 ppm to 75 ppm, 10 ppm to 50 ppm, 5 ppm to 50 ppm, or 5 ppm to 25 ppm. Of course, other individual values and subranges of less than 150 ppm of primary antioxidant present in the polyethylene composition are included and disclosed herein. As used herein, "primary antioxidant" refers to a radical scavenger that is generally an organic molecule consisting of a hindered phenol or hindered amine derivative. Examples of primary antioxidants include primary antioxidants that are well known in the polyolefin industry, such as, pentaerythrityl tetrakis(3-(3,5-di-tert-butyl-4-hydroxyphenol)propionate), which is commercially available from BASF under the name of IRGANOX™ 1010, or octadecyl 3-(3,5-di-tert-butyl-4-hydroxyphenyl)propionate, which is commercially available from BASF under the name IRGANOX™ 1076.

In embodiments herein, secondary antioxidants may optionally be used. In some embodiments, the polyethylene composition may comprise from 500 to 2000 ppm secondary antioxidant. Secondary antioxidants may prevent formation of additional free radicals by decomposing the peroxide into thermally stable, non-radical, non-reactive products by means of an efficient alternative to thermolysis and generation of free radicals. Phosphites and thioesters are examples of functionalities operating as secondary antioxidants. All individual values and subranges from 500 to 2000 ppm are included and disclosed herein; for example, the amount of secondary antioxidant in the polyethylene composition can be from a lower limit of 500, 700, 900, 1100, 1300, 1500, 1700 or 1900 ppm to an upper limit of 600, 800, 1000, 1200, 1400, 1600, 1800 or 2000 ppm. For example, when present, the secondary antioxidant may be present in an amount from 250 to 2000 ppm, or in the alternative, the secondary antioxidant may be present in an amount from 250 to 1500 ppm, or in the alternative, the secondary antioxidant may be present in an amount from 250 to 1250 ppm, or in the alternative, the secondary antioxidant may be present in an amount from 500 to 1250 ppm.

Free Radical Generator (FRG)

As noted above, the masterbatch comprises a free radical generator and a polyethylene resin. In embodiments herein, the free radical generator has a half-life at 220° C. of less than 200 seconds and a decomposition energy higher than (i.e., more negative than) −250 kJ/mol. In some embodiments, the free radical generator has a half-life at 220° C. of less than 175 seconds, 150 seconds, or 125 seconds. In other embodiments, the free radical generator has a half-life at 220° C. of from 60 to 200 seconds, 60 to 175 seconds, 60 to 150 second, 60 to 125 seconds, or 60 to 120 seconds.

In embodiments herein, the free radical generator may have a molecular weight from 200 to 1,000 Daltons. All individual values and subranges of from 200 to 1,000 Daltons are included and disclosed herein. For example, in some embodiments, the free radical generator may have a molecular weight from 225 to 1000, 250 to 1000, or 250 to 700.

In embodiments herein, the free radical generator is present in an amount ranging from 5 ppm to 1000 ppm relative to the total amount of resin in the modified polyethylene composition. All individual values and subranges from 5 to 1,000 ppm are included and disclosed herein; for example, the amount of free radical generator relative to the total amount of resin in the modified polyethylene composition may range from a lower limit of 5, 10, 20, 30, 50, 80, 100, 200, 300, 400, 500, 600, 700, 800 or 900 ppm to an upper limit of 15, 25, 30, 35, 50, 60, 65, 75, 100, 150, 250, 350, 450, 550, 650, 750, 850, 950 or 1000 ppm. In some embodiments, the amount of free radical generator reacted with the polyethylene composition may be in the range of from 5 to 100 ppm relative to the total amount of resin in the modified polyethylene composition, or in the alternative, the amount of free radical generator reacted with the polyethylene composition may be in the range of from 5 to 80 ppm relative to the total amount of resin in the modified polyethylene composition, or in the alternative, the amount of free radical generator reacted with the polyethylene composition may be in the range of from 5 to 75 ppm relative to the total amount of resin in the modified polyethylene composition, or in the alternative, the amount of free radical generator reacted with the polyethylene composition may be in the range of from 10 to 75 ppm relative to the total amount of resin in the modified polyethylene composition, or in the alternative, the amount of free radical generator reacted with the polyethylene composition may be in the range of from 5 to 50 ppm relative to the total amount of resin in the modified polyethylene composition. In other embodiments, the amount of free radical generator reacted with the polyethylene composition is less than 50 ppm or 30 ppm relative to the total amount of resin used in the modified polyethylene composition. In further embodiments, the amount of free radical generator reacted with the polyethylene composition may range from 5 ppm to 30 ppm, 10 ppm to 30 ppm, 15 to 25 ppm, 20 to 30 ppm, or 10 to 25 ppm relative to the total amount of resin in the modified polyethylene composition.

In embodiments herein, the free radical generator may be a cyclic peroxide. An example of a suitable cyclic peroxide may be represented by the formula:

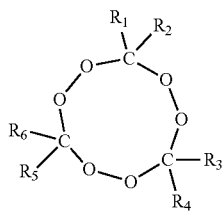

wherein R1-R6 are independently hydrogen or an inertly-substituted or unsubstituted C1-C20 alkyl, C3-C20 cycloalkyl, C6-C20 aryl, C7-C20 aralkyl, or C7-C20 alkaryl. Representative of the inert-substituents included in R1-R6 are hydroxyl, C1-C20 alkoxy, linear or branched C1-C20 alkyl, C6-C20 aryloxy, halogen, ester, carboxyl, nitrile, and amido. In some embodiments, R1-R6 are each independently lower alkyls, including, for example, C1-C10 alkyl, or C1-C4 alkyl.

Some of the cyclic peroxides as described herein are commercially available, but otherwise can be made by contacting a ketone with hydrogen peroxide as described in USP 3,003,000; Uhlmann, 3rd Ed., Vol. 13, pp. 256-57 (1962); the article, "Studies in Organic Peroxides XXV Preparation, Separation and Identification of Peroxides Derived from Methyl Ethyl Ketone and Hydrogen Peroxide," Milas, N. A. and Golubovic, A., J. Am. Chem. Soc, Vol. 81, pp. 5824-26 (1959); "Organic Peroxides", Swern, D. editor, Wiley-Interscience, New York (1970); and Houben-Weyl Methoden der Organische Chemie, El 3, Volume 1, page 736.

Examples of the other cyclic peroxides include those derived from acetone, methylamyl ketone, methylheptyl ketone, methylhexyl ketone, methylpropyl ketone, methylbutyl ketone, diethyl ketone, methylethyl ketone methyloctyl ketone, methylnonyl ketone, methyldecyl ketone and methylundecyl ketone. The cyclic peroxides can be used alone or in combination with one another.

In some embodiments, the cyclic peroxide may be 3,6,9-triethyl-3-6-9-trimethyl-1,4,7-triperoxonane, which is commercially available from AkzoNobel under the trade designation TRIGONOX 301. The cyclic peroxide used herein can be liquid, solid, or paste depending on the melting point of the peroxide and the diluent, if any, within which it is carried.

Polyethylene Resin

The polyethylene resin has a density ranging from 0.900 g/cm$^3$ to 0.970 g/cm$^3$ and a melt index ranging from 0.01 g/10 min to 100 g/10 min. All individual values and subranges of a density ranging from 0.900 g/cm$^3$ to 0.970 g/cm$^3$ and a melt index ranging from 0.01 g/10 min to 100 g/10 min are included and disclosed herein.

For example, in some embodiments, the density ranges from a lower limit of 0.900, 0.902, 0.905, 0.907, 0.910, 0.912, 0.915, 0.920, 0.925, 0.930, 0.935, or 0.940 g/cm$^3$ to an upper limit of 0.970, 0.965, 0.960, 0.955, 0.950, 0.945, 0.942, 0.940, 0.937, 0.935, 0.930, 0.927, 0.925, 0.922, or 0.920 g/cm$^3$. In other embodiments, the density ranges from 0.905 g/cm$^3$ to 0.965 g/cm$^3$, 0.905 g/cm$^3$ to 0.960 g/cm$^3$, 0.907 g/cm$^3$ to 0.960 g/cm$^3$, 0.910 g/cm$^3$ to 0.955 g/cm$^3$, 0.910 g/cm$^3$ to 0.950 g/cm$^3$, 0.910 g/cm$^3$ to 0.947 g/cm$^3$, 0.910 g/cm$^3$ to 0.945 g/cm$^3$, 0.910 g/cm$^3$ to 0.9420 g/cm$^3$, or 0.910 g/cm$^3$ to 0.940 g/cm$^3$.

For example, in some embodiments, the melt index ranges from a lower limit of 0.01, 0.05, 0.1, 0.5, 1, 3, 5, 7, 10, 12, 15, 18, 20, 23, 25, 30, 35, 40, 45, 50, 55, 60, 65, 70, 75, 80, 85, or 90 to an upper limit of 100, 95, 90, 85, 80, 75, 70, 65, 60, 55, 50, 45, 40, 35, 30, 27, 25, 22, 20, 17, 15, 12, 10, 8, 5, 2, 1, 0.9, 0.7, or 0.5. In other embodiments, the melt index ranges from 0.05 g/10 min to 30 g/10 min, 0.1 g/10 min to 30 g/10 min, 0.1 g/10 min to 25 g/10 min, 0.1 g/10 min to 20 g/10 min, 0.1 g/10 min to 18 g/10 min, 0.1 g/15 min to 30 g/10 min, 0.25 g/10 min to 15 g/10 min, 0.25 g/10 min to 12 g/10 min, 0.25 g/10 min to 10 g/10 min, 0.25 g/10 min to 8 g/10 min, 0.25 g/10 min to 5 g/10 min.

In some embodiments herein, the polyethylene resin may comprise less than 150 ppm of primary antioxidant. All individual values and subranges of less than 150 ppm of primary antioxidant are included and disclosed herein. For example, in some embodiments, the polyethylene resin may comprise less than 125 ppm, less than 100 ppm, less than 50 ppm, less than 25 ppm, or 0 ppm of primary antioxidant. Of course, other individual values and subranges of less than 150 ppm of primary antioxidant present in the polyethylene resin are included and disclosed herein.

In some embodiments herein, the masterbatch composition may comprise less than 150 ppm of primary antioxidant. All individual values and subranges of less than 150 ppm of primary antioxidant are included and disclosed herein. For example, in some embodiments, the masterbatch composition may comprise from a lower limit of 0, 10, 25, 50, 75 or 100 ppm to an upper limit of 15, 30, 50, 75, 100, or less than 150 ppm of primary antioxidant. In other embodiments herein, the masterbatch composition may comprise from 10 to 150 ppm, from 10 to 100 ppm, from 10 to 75 ppm, or from 10 to 50 ppm, of primary antioxidant.

In embodiments herein, secondary antioxidants may optionally be used. In some embodiments, the polyethylene resin may comprise from 500 to 2000 ppm secondary antioxidant. In some embodiments, the masterbatch composition may comprise from 500 to 2000 ppm secondary antioxidant. Secondary antioxidants may prevent formation of additional free radicals by decomposing the peroxide into thermally stable, non-radical, non-reactive products by means of an efficient alternative to thermolysis and generation of free radicals. Phosphites and thioesters are examples of functionalities operating as secondary antioxidants. All individual values and subranges from 500 to 2000 ppm are included and disclosed herein; for example, the amount of secondary antioxidant in the polyethylene resin or the masterbatch composition can be from a lower limit of 500, 700, 900, 1100, 1300, 1500, 1700 or 1900 ppm to an upper limit of 600, 800, 1000, 1200, 1400, 1600, 1800 or 2000 ppm. For example, when present, the secondary antioxidant may be present in an amount from 500 to 2000 ppm, or in the alternative, the secondary antioxidant may be present in an amount from 500 to 1500 ppm, or in the alternative, the secondary antioxidant may be present in an amount from 500 to 1250 ppm, or in the alternative, the secondary antioxidant may be present in an amount from 750 to 1250 ppm.

In one embodiment, the secondary antioxidant is present in the polyethylene composition prior to mixing with the masterbatch composition. In an alternative embodiment, the secondary antioxidant is a component in the masterbatch composition.

The polyethylene resin may be a low density polyethylene (LDPE), a linear low density polyethylene (LLDPE), a medium density polyethylene (MDPE), a high density polyethylene (HDPE), or combinations thereof. In some embodiments, the polyethylene resin is a LDPE. In other embodiments, the polyethylene resin is a LLDPE. In further embodiments, the polyethylene resin is a MDPE or a HDPE.

In embodiments herein where the polyethylene resin is an LDPE, the LDPE may include branched polymers that are partly or entirely homopolymerized or copolymerized in autoclave and/or tubular reactors, or any combination thereof, using any type of reactor or reactor configuration known in the art, at pressures above 14,500 psi (100 MPa) with the use of free-radical initiators, such as peroxides (see for example U.S. Pat. No. 4,599,392, herein incorporated by reference). In some embodiments, the LDPE may be made in an autoclave process under single phase conditions designed to impart high levels of long chain branching, such as described in PCT patent publication WO 2005/023912, the disclosure of which is incorporated herein. Examples of suitable LDPEs may include, but are not limited to, ethylene homopolymers, and high pressure copolymers, including ethylene interpolymerized with, for example, vinyl acetate, ethyl acrylate, butyl acrylate, acrylic acid, methacrylic acid, carbon monoxide, or combinations thereof. The ethylene may also be interpolymerized with an alpha-olefin comonomer, for example, at least one C3-C20 alpha-olefin, such as propylene, isobutylene, 1-butene, 1-pentene, 1-hexene, and mixtures thereof. Exemplary LDPE resins may include, but is not limited to, resins sold by The Dow Chemical Company, such as, LDPE 4016 resins, LDPE 1321 resins, LDPE 6211 resins, LDPE 6621 resins, or AGILITY™ 1000 and 2001 resins, resins sold by Westlake Chemical Corporation (Houston, Tex.), such as EF412, EF602, EF403, or EF601, resins sold by LyondellBasell Industries (Houston, Tex.), such as, PETROTHENE™ M2520 or NA940, and resins sold by The ExxonMobil Chemical Company (Houston, Tex.) such as, LDPE LD 051.LQ or NEXXSTAR™ LDPE-00328. Other exemplary LDPE resins are described in WO 2014/051682 and WO 2011/019563, which are herein incorporated by reference.

In embodiments herein where the polyethylene resin is a LLDPE, the LLDPE may be a homogeneously branched or heterogeneously branched and/or unimodal or multimodal (e.g., bimodal) polyethylene. The linear low density polyethylene comprises ethylene homopolymers, interpolymers of ethylene and at least one comonomer, and blends thereof. Examples of suitable comonomers may include alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the linear low density polyethylene is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the linear low density polyethylene is an ethylene/alpha-olefin copolymer, wherein the alpha-olefin is selected from the group consisting of propylene, 1-butene, 1-hexene, and 1-octene. In further embodiments, the linear low density polyethylene is an ethylene/alpha-olefin copolymer, wherein the alpha-olefin is selected from the group consisting of 1-hexene and 1-octene.

The linear low density polyethylene can be made via gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. Suitable linear low density polyethylene may be produced according to the processes described at pages 15-17 and 20-22 in WO 2005/111291 A1, which is herein incorporated by reference. The catalysts used to make the linear low density polyethylene described herein may include Ziegler-Natta, chrome, metallocene, constrained geometry, or single site catalysts. Examples of suitable linear low density polyethylene include substantially linear ethylene polymers, which are further defined in U.S. Pat. Nos. 5,272,236, 5,278,272, 5,582,923, 5,733,155, and EP2653392, and which are incorporated by reference; homogeneously branched linear ethylene polymer compositions, such as those in U.S. Pat. No. 3,645,992, which is incorporated by reference; heterogeneously branched ethylene polymers, such as those prepared according to the process disclosed in U.S. Pat. No. 4,076,698; and/or blends thereof (such as those disclosed in U.S. Pat. No. 3,914,342 or 5,854,045), all of which is incorporated by reference. In some embodiments, the linear low density polyethylene may include ELITE™, ELITE™ AT, ATTANE™, AFFINITY™, FLEXOMER™, or DOWLEX™ resins sold by The Dow Chemical Company, including, for example, ELITE™ 5100G or 5400G resins, ELITE™ AT 6401, ATTANE™ 4201 or 4202 resins, AFFINITY™ 1840, and DOWLEX™ 2020, 2045G, 2049G, or 2685 resins; EXCEED™ or ENABLE™ resins sold by Exxon Mobil Corporation, including, for example, EXCEED™ 1012, 1018 or 1023JA resins, and ENABLE™ 27-03, 27-05, or 35-05 resins; linear low density polyethylene resins sold by Westlake Chemical Corporation, including, for example, LLDPE LF1020 or HIFOR Xtreme™ SC74836 resins; linear low density polyethylene resins sold by LyondellBasell Industries, including, for example, PETROTHENE™ GA501 and LP540200 resins, and ALA- THON™ L5005 resin; linear low density polyethylene resins sold by Nova Chemicals Corp., including, for example, SCLAIR™ FP120 and NOVAPOL™ TF-Y534; linear low density polyethylene resins sold by Chevron Phillips Chemical Company, LLC, including, for example, mPACT™ D139 or D350 resins and MARFLEX™ HHM TR-130 resin; linear low density polyethylene resins sold by Borealis AG, including, for example, BORSTAR™ FB 2310 resin.

In embodiments herein where the polyethylene resin is a MDPE, the MDPE may be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the MDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the MDPE is an ethylene/alpha-olefin copolymer, wherein the alpha-olefin is selected from the group consisting of propylene, 1-butene, 1-hexene, and 1-octene. The MDPE may have a density of from 0.923 g/cm$^3$ and 0.935 g/cm$^3$. All individual values and subranges are included and disclosed herein.

The MDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the MDPE is made in the solution process operating in either parallel or series dual reactor mode. The MDPE may also be made by a high pressure, free-radical polymerization process. Methods for preparing MDPE by high pressure, free radical polymerization can be found in U.S. 2004/0054097, which is herein incorporated by reference, and can be carried out in an autoclave or tubular reactor as well as any combination thereof. The catalysts used to make the MDPE described herein may include Ziegler-Natta, metallocene, constrained geometry, single site catalysts, or chromium-based catalysts. Exemplary suitable MDPE resins may include resins sold by The Dow Chemical Company, such as, DOWLEX™ 2038.68G or DOWLEX™ 2042G, resins sold by LyondellBasell Industries (Houston, Tex.), such as, PETROTHENE™ L3035, ENABLE™ resins sold by The ExxonMobil Chemical Company (Houston, Tex.), resins sold by Chevron Phillips Chemical Company LP, such as, MARFLEX™ TR-130, and resins sold by Total Petrochemicals & Refining USA Inc., such as HF 513, HT 514, and HR 515. Other exemplary MDPE resins are described in U.S. 2014/0255674, which is herein incorporated by reference.

In embodiments herein where the polyethylene resin is a HDPE, the HDPE may also be an ethylene homopolymer or copolymers of ethylene and alpha-olefins. Suitable alpha-olefins may include those containing from 3 to 20 carbon atoms (C3-C20). For example, the alpha-olefin may be a C4-C20 alpha-olefin, a C4-C12 alpha-olefin, a C3-C10 alpha-olefin, a C3-C8 alpha-olefin, a C4-C8 alpha-olefin, or a C6-C8 alpha-olefin. In some embodiments, the HDPE is an ethylene/alpha-olefin copolymer, wherein the alpha-olefin is selected from the group consisting of propylene, 1-butene, 1-pentene, 1-hexene, 4-methyl-1-pentene, 1-heptene, 1-octene, 1-nonene and 1-decene. In other embodiments, the HDPE is an ethylene/alpha-olefin copolymer, wherein the alpha-olefin is selected from the group consisting of propylene, 1-butene, 1-hexene, and 1-octene. The amount of comonomer used will depend upon the desired density of the HDPE polymer and the specific comonomers selected, taking into account processing conditions, such as temperature and pressure, and other factors such as the presence or absence of telomers and the like, as would be apparent to one of ordinary skill in the art in possession of the present disclosure. The HDPE may have a density of from 0.935 g/cm$^3$ and 0.975 g/cm$^3$. All individual values and subranges are included and disclosed herein.

The HDPE may be made by a gas-phase, solution-phase, or slurry polymerization processes, or any combination thereof, using any type of reactor or reactor configuration known in the art, e.g., fluidized bed gas phase reactors, loop reactors, stirred tank reactors, batch reactors in parallel, series, and/or any combinations thereof. In some embodiments, gas or slurry phase reactors are used. In some embodiments, the HDPE is made in the solution process operating in either parallel or series dual reactor mode. The catalysts used to make the HDPE described herein may include Ziegler-Natta, metallocene, constrained geometry, single site catalysts, or chromium-based catalysts. The HDPE can be unimodal, bimodal, and multimodal. Exemplary HDPE resins that are commercially available include, for instance, ELITE™ 5940G, ELITE™ 5960G, HDPE 35454L, HDPE 82054, HDPE DGDA-2484 NT, DGDA-2485 NT, DGDA-5004 NT, DGDB-2480 NT resins available from The Dow Chemical Company (Midland, Mich.), L5885 and M6020 HDPE resins from Equistar Chemicals, LP, ALATHON™ L5005 from LyondellBasell Industries (Houston, Tex.), and MARFLEX™ HDPE HHM TR-130 from Chevron Phillips Chemical Company LP. Other exemplary HDPE resins are described in U.S. Pat. No. 7,812,094, which is herein incorporated by reference.

Modified Polyethylene Composition

As noted above, disclosed herein is a method for increasing the melt strength and/or low shear viscosity of a polyethylene composition. Without being bound by theory, it is believed that the introduction of the inventive free radical generators described herein produces long chain branches or similar structure into the polymer, thereby increasing melt strength and/or low shear viscosity. The method comprises: a) providing a polyethylene composition comprising the reaction product of ethylene and optionally, one or more alpha-olefin comonomers, wherein the polyethylene composition is characterized by the following properties: a density ranging from 0.900 g/cm$^3$ to 0.970 g/cm$^3$, a molecular weight distribution (Mw/Mn) ranging from 2.6 to 3.5, and from 0.10 to 0.27 vinyl groups per 1,000 total carbon atoms; b) providing a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density ranging from 0.900 g/cm$^3$ to 0.970 g/cm$^3$, melt index ranging from 0.01 g/10 min to 100 g/10 min; and c) reacting the polyethylene composition with the masterbatch composition to form a modified polyethylene composition. In some embodiments, a film may be formed from the modified polyethylene composition described herein. The film may be a blown film or a cast film. The film may also be a multilayer film or a monolayer film. In other embodiments, a blow molded article may be formed from the modified polyethylene composition described herein.

The reacting of the polyethylene composition with the masterbatch composition can be carried out in any customary mixing equipment in which the polymer is melted and mixed with the masterbatch. Suitable equipment is known to those skilled in the art, including for example, mixers, kneaders, and extruders. In some embodiments, the reacting of the polyethylene composition with the free radical generator takes place in an extruder. The extruder may further be attached to a blown-film or cast film line. In some embodiments, the reacting of the polyethylene composition with the free radical generator takes place in an extruder attached to a blown-film or cast film line.

Exemplary extruder or kneader equipment includes, for example, single-screw extruders, contra-rotating and co-rotating twin-screw extruders, planetary-gear extruders, ring extruders, or co-kneaders. Suitable extruders and kneaders are further described, for example, in Handbuch der Kunststoftextrusion, Vol 1 Grundlagen, Editors F. Hensen, W. Knappe, H. Potente, 1989, pp. 3-7, ISBN.3-446-14339-4 (Vol 2 Extrusionsanlagen 1986, ISBN 3-446-14329-7). In embodiments herein, the screw length can range from 1-60 times the screw diameter, or 35-48 times the screw diameters. The rotational speed of the screw may range from 10-600 rotations per minute (rpm), or 25-300 rpm. The maximum throughput is dependent on the screw diameter, the rotational speed, and the driving force. The process of the present invention can also be carried out at a level lower than maximum throughput by varying the parameters mentioned or employing weighing machines delivering dosage amounts.

The polyethylene composition and the masterbatch may be reacted at a ratio of 60:40 to 99.9:0.1. All individual values and subranges are included and disclosed herein. For example, in some embodiments, the polyethylene composition and the masterbatch may be reacted at a ratio of 65:35 to 99.9:0.1, 65:35 to 99.9:0.1, 70:30 to 99.9:0.1, 75:25 to 99.9:0.1, 80:20 to 99.9:0.1, 85:15 to 99.9:0.1, 90:10 to 99.9:0.1, 95:5 to 99.9:0.1, 97:3 to 99.9:0.1, 95:5 to 99:1, or 97:3 to 99:1. The polyethylene composition and masterbatch may also be reacted such that the amount of masterbatch in the polyethylene composition ranges from 0.1 to 40 wt. %. All individual values and subranges are included and disclosed herein. For example, in some embodiments, the polyethylene composition and the masterbatch may be reacted such that the amount of masterbatch in the polyethylene composition ranges from 0.1 to 35 wt. %, 0.1 to 30 wt. %, 0.1 to 25 wt. %, 0.1 to 20 wt. %, 0.1 to 15 wt. %, 0.1 to 10 wt. %, 0.1 to 5 wt. %, 0.1 to 3 wt. %, 1 to 5 wt. %, or 1 to 3 wt. %.

The polyethylene composition and masterbatch are subjected to a temperature above the softening point of the polymers for a sufficient period of time such that the reaction between the polyethylene composition and the free radical generator can take place. In some embodiments, the polyethylene composition and masterbatch are subjected to a temperature of less than or equal to 280° C. All individual values and subranges from less than or equal to 280° C. are included herein and disclosed herein. For example, the temperature can be less than or equal to 280, 260, 250, 240, 220, 200, 180 or 160° C. In some embodiments, the temperature is from 120° C. to 280° C., 140° C. to 280° C., 160° C. to 280° C., 180° C. to 280° C., or 180° C. to 260° C. In an alternative embodiment, the temperature is from 200° C. to 260° C. It will be understood that the period of time necessary for reaction can vary as a function of the temperature, the amount of material to be reacted, and the type of equipment used. Under exemplary conditions, the time at which the temperature above the softening point of the polymers is maintained may be from 10 seconds to 30 minutes. All individual values and subranges are included herein and disclosed herein; for example, the time can be from a lower limit of 10 seconds, 20 seconds, 30 seconds, 1 minute, 5 minutes, 15, minutes or 25 minutes to an upper limit of 45 seconds, 3 minutes, 8 minutes, 10 minutes, 12 minutes, 15 minutes, 18 minutes, 20 minutes, 23 minutes, or 30 minutes. For example, the time can be in the range of from 10 seconds to 20 minutes, or in the alternative, the time can be in the range of from 10 seconds to 15 minutes, or in the alternative, the time can be in the range of from 10 seconds to 10 minutes, or in the alternative, the time can be in the range of from 20 seconds to 20 minutes, or in the alternative, the time can be in the range of from 15 minutes to 30 minutes.

The modified polyethylene composition may have a viscosity ratio (viscosity at 0.1 rad/s/viscosity at 100 rad/s, both measured at 190° C.) of 12 to 33. All individual values and subranges of from 12 to 33 are included and disclosed herein. For example, the modified polyethylene composition may have a viscosity ratio of from 12 to 30 or 15 to 30.

In addition to the viscosity ratio, the modified polyethylene composition may have a melt strength of 7.5 to 15 cN at 190° C. All individual values and subranges of from 7.5 to 15 cN at 190° C. are included and disclosed herein. For example, the polyethylene composition may have a melt strength of from 8 to 14 or 8 to 13 cN at 190° C.

In embodiments herein, the modified polyethylene composition may contain one or more additives. Additives include, but are not limited to, processing aids, nucleating agents, fluoropolymers, thermal stabilizers, antistatic agents, UV stabilizers, clarifiers, pigments or colorants, fatty acid stearates, fillers, and combinations thereof. The modified polyethylene composition may comprise from 0.001 to 10 wt. %, based on the weight of the modified polyethylene composition, of the one or more additives.

Exemplary nucleating agents may include one or more of metal carboxylates, metal aromatic carboxylate, hexahydrophthalic acid metal salts, stearates, organic phosphates, bisamides, sorbitols, and mixtures thereof. For example and not by way of limitation, suitable commercial examples of nucleating agents may include one or more of Hyperform® HPN-68L (which is primarily a disodium salt of bicyclo [2.2.1]heptane-2,3-dicarboxylic acid), Hyperform® HPN-20E (which is a mixture of zinc stearate and a calcium salt of 1,2-cyclohexanedicarboxylic acid), or Hyperform® HPN-600ei (which is primarily a disodium salt of bicyclo [2.2.1]heptane-2,3-dicarboxylic acid), or Hyperform® HPN-210M, which are available from Milliken Chemical (Spartanburg, S.C.). The nucleating agents may be present in the modified polyethylene composition in an amount of 0.001 to 5 wt. %, based on the weight of the modified polyethylene composition.

Test Methods

Density

Samples for density measurements were prepared according to ASTM D 4703 Annex A1 Procedure C. Approx. 7 g of sample was placed in a "2"×2"×135 mil thick" mold, and this was pressed at 374° F. (190° C.) for 6 mins at 3,000 lb$_f$. The pressure was increased to 30,000 lb$_f$ for 4 mins. This was followed by cooling at 15° C./min, at 30,000 lb$_f$, to approx. a temp. of 40° C. The "2"×2"×135 mil" polymer sample (plaque) was removed from the mold, and 3 samples were cut from the plaque with a ½×1" die cutter. Measurements were made within 1 hour of sample pressing, using ASTM D792, Method B, and an average of 3 measurements reported.

Melt Index

Melt index (MI), or I2, is measured in accordance with ASTM D 1238, Condition 190° C./2.16 kg, Procedure B, and reported in grams eluted per 10 minutes (g/10 min). I10, is measured in accordance with ASTM D 1238, Condition 190° C./10 kg, Procedure B, and reported in grams eluted per 10 minutes (g/10 min).

Melt Strength

Melt strength is measured at 190° C. using a Goettfert Rheotens 71.97 (Goettfert Inc.; Rock Hill, S.C.), melt fed with a Goettfert Rheotester 2000 capillary rheometer equipped with a flat entrance angle (180 degrees) of length of 30 mm and diameter of 2 mm. The pellets are fed into the barrel (L=300 mm, Diameter=12 mm), compressed and allowed to melt for 10 minutes before being extruded at a constant piston speed of 0.265 mm/s, which corresponds to a wall shear rate of 38.2 $s^{-1}$ at the given die diameter. The extrudate passes through the wheels of the Rheotens located at 100 mm below the die exit and is pulled by the wheels downward at an acceleration rate of 2.4 $mm/s^2$. The force (in cN) exerted on the wheels is recorded as a function of the velocity of the wheels (mm/s). Melt strength is reported as the plateau force (cN) before the strand breaks.

Dynamic Mechanical Spectroscopy (DMS)

Resins are compression-molded into "3 mm thick×25 mm" circular plaques at 350° F. (° C. for consistency), for five minutes, under 25,000 lbs, in air. The sample is then taken out of the press, and placed on a counter to cool.

A constant temperature frequency sweep is performed using a TA Instruments "Advanced Rheometric Expansion System (ARES)," equipped with 25 mm (diameter) parallel plates, under a nitrogen purge. The sample is placed on the plate, and allowed to melt for five minutes at 190° C. The plates are then closed to a gap of "2 mm," the sample trimmed (extra sample that extends beyond the circumference of the "25 mm diameter" plate is removed), and then the test is started. The method has an additional five minute delay built in, to allow for temperature equilibrium. The experiments are performed at 190° C. over a frequency range of 0.1 to 100 rad/s. The strain amplitude is constant at 10%.

Crystallization Elution Fractionation (CEF) Method

The Crystallization Elution Fractionation (CEF) technology is conducted according to Monrabal et al, Macromol. Symp. 257, 71-79 (2007). The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 or IR-5 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2~0.5 mm) (such as commercially available from EMD Chemicals) is also obtained. The silica gel is dried in a vacuum oven at 160° C. for at least two hours before use. ODCB is sparged with dried nitrogen ($N_2$) for one hour before use. Dried nitrogen is obtained by passing nitrogen at <90 psig over $CaCO_3$ and 5 Å molecular sieves. ODCB is further dried by adding five grams of the dried silica to two liters of ODCB or by pumping through a column or columns packed with dried silica between 0.1 ml/min to 1.0 ml/min Eight hundred milligrams of BHT are added to two liters of ODCB if no inert gas such as $N_2$ is used in purging the sample vial. Dried ODCB with or without BHT is hereinafter referred to as "ODCB-m." A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The IR-4 or IR-5 signal data is collected at one data point/second.

The CEF column is packed with glass beads at 125 μm±6% (such as those commercially available with acid wash from MO-SCI Specialty Products) with ⅛ inch stainless tubing according to U.S. Pat. No. 8,372,931. The internal liquid volume of the CEF column is between 2.1 ml and 2.3 ml. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Comonomer Distribution Breadth Index (CDBI)

The CDBI is calculated using the methodology described in WO/93/03093 from data obtained from CEF. CDBI is defined as the weight percent of the polymer molecules having a comonomer content within 50 percent of the median total molar comonomer content. It represents a comparison of the comonomer distribution in the polymer to the comonomer distribution expected for a Bernoullian distribution.

CEF is used to measure the short chain branching distribution (SCBD) of the polyolefin. A CEF molar comonomer content calibration is performed using 24 reference materials (e.g., polyethylene octene random copolymer and ethylene butene copolymer) with a narrow SCBD having a comonomer mole fraction ranging from 0 to 0.108 and a Mw from 28,400 to 174,000 g/mole. The ln (mole fraction of ethylene), which is the ln (comonomer mole fraction), versus 1/T (K) is obtained, where T is the elution temperature in Kelvin of each reference material. The comonomer distribution of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317.

Vinyl Groups
Sample Preparation

The samples were prepared by adding ~130 mg of sample to 3.25 g of 50/50 by weight Tetrachlorethane-d2/Perchloroethylene with 0.001 M Cr(AcAc)3 in a Norell 1001-7 10 mm NMR tube. The samples were purged by bubbling nitrogen through the solvent via a pipette inserted into the tube for approximately 5 minutes, capped, sealed with Teflon tape and then soaked at room temperature overnight to facilitate sample dissolution. The samples were heated and vortexed at 115° C. to ensure homogeneity.

Data Acquisition Parameters $^1$H NMR was performed on a Bruker AVANCE 400 MHz spectrometer equipped with a Bruker Dual DUL high-temperature CryoProbe and a sample temperature of 120° C. Two experiments were run to obtain spectra, a control spectrum to quantitate the total polymer protons, and a double presaturation experiment, which suppresses the intense polymer backbone peaks and enables high sensitivity spectra for quantitation of the end-groups. The control was run with ZG pulse, 4 scans, AQ 1.64 s, D1 (relaxation delay) 14 s. The double presaturation experiment was run with a modified pulse sequence, 100 scans, DS 4, AQ 1.64 s, D1 (presaturation time) 1 s, D13 (relaxation delay) 13 s. The region between 4.95 to 5.15 ppm was integrated to determine vinyl content.

Antioxidant Concentration

Antioxidants IRGANOX™ 1010, IRGANOX™ 1076, IRGAFOS™ 168, and tris(nonylphenyl) phosphite ("TNPP") were measured by reversed phase liquid chromatography (Agilent 1260 equipped with a Zorbax Eclipse XDB-C8, 5-µm particle, 4.6×12.5 mm guard column coupled to a Zorbax, Eclipse XDB-C8, 3.5 µm particle, 4.6×50 mm column, and UV absorbance detection at a wavelength of 210 nm). Each polymer resin sample (1 g) was dissolved in 25 mL hot o-xylene followed by reprecipitation of the polymer either into 50 mL methanol (IRGANOX™ 1010, IRGANOX™ 1076, IRGAFOS™ 168), or 50 mL isopropanol (TNPP). After the polymer resin sample was allowed to settle, an aliquot of the supernatant was filtered (0.2 µm PTFE syringe filter) into a 2 mL glass autosampler vial and the vial was capped with a Teflon lined crimp cap. The vials were placed in the LC autosampler for analysis in duplicate and the average concentration was reported. Quantitation was performed using an external standardization procedure based on peak areas.

High Temperature Gel Permeation Chromatography (HT-GPC)

A PolymerChar (Valencia, Spain) high temperature Gel Permeation Chromatography system consisting of an infra-red concentration detector (IR-5) is used for MW and MWD determination. The solvent delivery pump, the on-line solvent degas device, auto-sampler, and column oven are from Agilent. The column compartment and detector compartment are operated at 150° C. The columns are three PLgel 10 µm Mixed-B, columns (Agilent). The carrier solvent is 1,2,4-trichlorobenzene (TCB) with a flow rate of 1.0 mL/min. Both solvent sources for chromatographic and sample preparation contained 250 ppm of butylated hydroxytoluene (BHT) and are nitrogen sparged. Polyethylene samples are prepared at targeted polymer concentrations of 2 mg/mL by dissolving in TCB at 160° C. for 3 hour on the auto-sampler just prior the injection. The injection volume is 200 µL.

Calibration of the GPC column set is performed with 21 narrow molecular weight distribution polystyrene standards. The molecular weights of the standards ranged from 580 to 8,400,000 g/mol, and are arranged in 6 "cocktail" mixtures, with at least a decade of separation between individual molecular weights. The polystyrene standard peak molecular weights are converted to polyethylene molecular weights using the following equation (as described in Williams and Ward, J. Polym. Sci., Polym. Let., 6, 621 (1968)):

$$M_{polyethylene} = A(M_{polystyrene})^B$$

Here B has a value of 1.0, and the experimentally determined value of A is around 0.42.

A third order polynomial is used to fit the respective polyethylene-equivalent calibration points obtained from equation (1) to their observed elution volumes. The actual polynomial fit is obtained so as to relate the logarithm of polyethylene equivalent molecular weights to the observed elution volumes (and associated powers) for each polystyrene standard.

Number-, weight- and z-average molecular weights are calculated according to the following equations:

$$\overline{Mn} = \frac{\sum_i Wf_i}{\sum_i (Wf_i/M_i)} \quad (2)$$

$$\overline{Mw} = \frac{\sum_i (Wf_i * M_i)}{\sum_i Wf_i} \quad (3)$$

$$\overline{Mz} = \frac{\sum_i (Wf_i * M_i^2)}{\sum_i (Wf_i * M_i)} \quad (4)$$

Where, $Wf_i$ is the weight fraction of the i-th component and $M_i$ is the molecular weight of the i-th component. The MWD is expressed as the ratio of the weight average molecular weight (Mw) to the number average molecular weight (Mn).

The accurate A value is determined by adjusting A value in equation (1) until Mw, the weight average molecular weight calculated using equation (3) and the corresponding retention volume polynomial, agreed with the independently determined value of Mw obtained in accordance with the linear homopolymer reference with known weight average molecular weight of 120,000 g/mol.

Neutron Activation Method for Metals

Two sets of duplicate samples are prepared by transferring approximately 3.5 grams of the pellets into pre-cleaned 2 dram polyethylene vials. Standards are prepared for each metal tested from their NIST traceable standard solutions (Certi. pure from SPEX) into 2-dram polyethylene vials. They are diluted using milli-Q pure water to 6 ml and the vials are heat-sealed. The samples and standards are then analyzed for these elements, using a Mark I TRIGA nuclear reactor. The reactions and experimental conditions used for these elements are summarized in the table below. The samples are transferred to un-irradiated vials before doing the gamma-spectroscopy. The elemental concentrations are calculated using CANBERRA software and standard comparative technique. Table 1 provides measurement parameters for metals determination.

TABLE A

Reactions and experimental conditions used for elements during neutron activation.

| Elements | Nuclear reaction | Isotope | Half life | Reactor Power |
|---|---|---|---|---|
| Al | $^{27}Al(n, \gamma)^{28}Al$ | $^{28}Al$ | 2.24 m | 250 kW |
| Cl | $^{37}Cl(n, \gamma)^{38}Cl$ | $^{38}Cl$ | 37.2 m | 250 kW |
| Cr | $^{50}Cr(n, \gamma)^{51}Cr$ | $^{51}Cr$ | 27.7 d | 250 kW |
| Hf | $^{180}Hf(n, \gamma)^{181}Hf$ | $^{181}Hf$ | 42.4 d | 250 kW |
| Mg | $^{26}Mg(n, \gamma)^{27}Mg$ | $^{27}Mg$ | 9.46 m | 250 kW |
| Mo | $^{98}Mo(n, \gamma)^{99}Mo$ | $^{99}Mo$ | 66.0 h | 250 kW |
| Nb | $^{93}Nb(n, \gamma)^{94m}Nb$ | $^{94m}Nb$ | 6.26 m | 250 kW |
| Ta | $^{181}Ta(n, \gamma)^{182}Ta$ | $^{182}Ta$ | 114.4 d | 250 kW |
| Ti | $^{50}Ti(n, \gamma)^{51}Ti$ | $^{51}Ti$ | 5.76 m | 250 kW |
| W | $^{186}W(n, \gamma)^{187}W$ | $^{187}W$ | 23.7 h | 250 kW |
| V | $^{51}V(n, \gamma)^{52}V$ | $^{52}V$ | 3.75 m | 250 kW |
| Zr | $^{96}Zr(n, \gamma)^{97}Zr$ | $^{97}Zr$ | 16.91 h | 250 kW |

| Elements | Irradiation Time | Waiting Time | Counting Time | Gamma Energy, keV |
|---|---|---|---|---|
| Al | 2 m | 4 m | 4.5 min | 1778.5 |
| Cl | 2 m | 4 m | 4.5 min | 1642.5, 2166.5 |
| Cr | 90 m | 5 h | 1.6 h | 320 |
| Hf | 90 m | 5 h | 1.6 h | 133, 482 |
| Mg | 2 m | 4 m | 4.5 min | 843.8, 1014 |
| Mo | 90 m | 5 h | 1.6 h | 181, 739.7, 141 |
| Nb | 2 m | 4 m | 4.5 min | 871 |
| Ta | 90 m | 5 h | 1.6 h | 1121, 1222 |
| Ti | 2 m | 4 m | 4.5 min | 320 |
| W | 90 m | 5 h | 1.6 h | 135, 481 |
| V | 2 m | 4 m | 4.5 min | 1434 |
| Zr | 90 m | 5 h | 1.6 h | 743.4 |

Half-Life

The thermal decomposition of different free radical generators (FRGs), as a 10% w/w solution in $C_{20}H_{42}$ (eicosane), was investigated with a SensysEvo DSC instrument (Setaram, France) both under isothermal conditions and the temperature scanning mode. In order to obtain the rate law (kinetic parameters) of the thermal decomposition of the FRGs, the 10% w/w solutions of the FRG in $C_{20}H_{42}$ (eicosane) were measured under temperature scanning mode in the temperature interval from 75° C. to 350° C. at five different scanning rates, namely 1° C./min, 2.5° C./min, 5° C./min, 10° C./min, and 20° C./min, respectively. About 60 mg of sample (the 10% w/w of the FRG in eicosane) was loaded into 170 mL Al pans and placed into the DSC instrument at 75° C. (above the melting point of paraffin) under a nitrogen atmosphere (20 cc/min). After thermal equilibration, the temperature was scanned according to the above-mentioned temperature program and the thermograms were recorded. Exothermic peaks were recorded in the temperature intervals from 120° C. to 320° C. The amount of heat released, $-\Delta Hr$ (J/g), is determined from the DSC curves for each specimen, which allows for calculation of the reaction progress/conversion with temperature. The kinetic parameters describing the decomposition rate law were determined both by isoconversional methods (using the AKTS Thermokinetic Software, AKTS AG, Switzerland) and the best fitting parameters according to the Sestak-Berggren autocatalytic model. The activation energy, $E_a$ (kJ/mol), and the apparent pre-exponential factor, $\ln A(\alpha) \cdot f(\alpha)(s^{-1})(-)$ as a function of decomposition progress, $\alpha$, are determined using the Friedman differential isoconversional method and the Ozawa integral isoconversional method. The general form of Sestak-Berggren equation is given below:

$$\frac{d\alpha}{dt} = A \cdot \exp^{-E_a/RT} \alpha^m (1-\alpha)^n$$

and the activation energy, $E_a$, the pre-exponential factor, $A$, and the reaction orders, m and n, in the above equation are determined by the best fitting method. The $E_a$, A, m, and n parameters can then be used to calculate the FRG half-life at any temperature using the AKTS Thermokinetic Software.

Decomposition Energy & Peak Decomposition Temperature

Differential Scanning calorimetry (DSC) was used to measure the decomposition energies and peak decomposition temperatures. The TA Instruments Q2000 DSC, equipped with an RCS (refrigerated cooling system) was used to perform this analysis. A 0.5-2 mg sample was placed in a glass capillary tube, weighed, and flame sealed under nitrogen while being kept cool using a "cold finger" device. Analysis was then performed to determine its thermal properties.

The thermal behavior of the sample was determined by ramping the sample temperature up to create a heat flow versus temperature profile. First, the sample was heated from 0° C. to 400° C., at a rate of 10° C./min Next, the sample was cooled. The sample was then heated again (this is the "reheat" ramp) at a 10° C./minute heating rate. Both heating curves were recorded. The initial heat curve was analyzed by setting baseline points from the beginning to the end of thermal activity. The reheat was used to assist in the determination of integration start and end.

For the free radical generators, the peak temperature was recorded as well as the total decomposition energy by integration of the area between the curve of the first heat cycle and the baseline. If the decomposition is exothermic, then the area between the curve and the baseline is integrated as negative due to the fact that there is negative heat flow. That is, the sample generates heat. If the sample is endothermic such that it takes heat, then the area is integrated as a positive number.

The heat under the exotherm peak was divided by the purity to extrapolate to 100% pure radical generator.

Maximum Blown Film Output Rate

The maximum blown film output rate is determined by increasing the output rate to the point where bubble stability is the limiting factor. The bubble stability at maximum output rate is determined by taking the bubble to the point where it would not stay seated in the air ring. At that point, the rate is reduced to where the bubble is reseated (maximum output rate) in the air ring. The cooling on the bubble is adjusted by adjusting the air ring and maintaining the bubble. This process determines the maximum output rate while maintaining bubble stability.

Dart Impact Resistance

Dart impact resistance is measured according to ASTM D1709.

Puncture Resistance

Puncture resistance is measured using a modified ASTM D5748 with a 0.5" diameter stainless steel probe.

MD/CD Free Shrinkage

Free thermal shrinkage in the machine and cross directions is measured using an oil bath method. A 4"×4" film sample is placed in a film holder and immersed in a hot oil bath maintained at the desired temperature (140° C.). After 30 s, the film is removed from the oil bath, allowed to cool, and film dimensions are measured in both machine and cross directions. Free shrinkage is calculated according to the equation below, where $L_0$ is the original length, and $L_f$ is the length after shrinkage.

$$\text{Free Shrinkage (\%)} = \frac{L_0 - L_f}{L_0} \times 100$$

MD/CD Shrink Tension

Shrink tension is measured in the machine and cross directions using a RSA III rheometer (TA Instruments). This method measures the shrink force as a clamped rectangular specimen (65 mm×12.7 mm) contracts when heated from 25° C. to 160° C. in a controlled fashion. The heating rate is maintained at 90° C./min from 25-90° C. and 20° C./min from 90-160° C. The shrink tension is calculated according to the equation below, where σ is the shrink tension in MPa, F is the shrink force in gf, and t and W are the film thickness and width in mm, respectively.

$$\sigma = \frac{\text{Shrink Force}}{\text{Cross Sectional Area}} = \frac{F \times 0.0098}{t \times W}$$

EXAMPLES

The following materials were used in the examples.

TABLE 1A

| Materials | Density (g/cm³) | Melt Index (I2) (g/10 min) | I10/I2 | CDBI % |
|---|---|---|---|---|
| ENABLE ™ 35-05, available from ExxonMobil Chemical Company (Houston, TX) | 0.935 | 0.50 | 13.7 | 83.8 |
| EXCEED ™ 1018, available from ExxonMobil Chemical Company (Houston, TX) | 0.918 | 1.0 | 5.9 | 68.8 |
| SCLAIR ™ FP120, available from Nova Chemicals Corporation (Calgary, Canada) | 0.920 | 1.0 | 7.9 | 56.5 |
| FLEXUS ™ 9212XP, available from Braskem S.A., (São Paulo, Brazil) | 0.917 | 1.0 | 5.9 | 73.0 |
| TUFLIN ™ HS-7028, available from The Dow Chemical Company (Midland, MI) | 0.918 | 1.0 | 7.5 | 24.8 |
| DOWLEX ™ 2045G, available from The Dow Chemical Company (Midland, MI) | 0.920 | 1.0 | 8.1 | 35.4 |
| DOWLEX ™ NG2045B, available from The Dow Chemical Company (Midland, MI) | 0.920 | 1.0 | 7.6 | 49 |
| PE Composition 1 | 0.935 | 1.0 | 6.9 | 58.6 |
| PE Composition 2 | 0.915 | 1.0 | 7.3 | 48.8 |

TABLE 1B

| Materials | Mw (g/mol) | Mn (g/mol) | Mz (g/mol) | Mw/Mn |
|---|---|---|---|---|
| ENABLE ™ 35-05, available from ExxonMobil Chemical Company (Houston, TX) | 101,336 | 26,312 | 243,025 | 3.85 |
| EXCEED ™ 1018, available from ExxonMobil Chemical Company (Houston, TX) | 110,747 | 40,642 | 213,973 | 2.73 |
| SCLAIR ™ FP120, available from Nova Chemicals Corporation (Calgary, Canada) | 118,664 | 25,686 | 420,178 | 4.62 |
| FLEXUS ™ 9212XP, available from Braskem S.A., (São Paulo, Brazil) | 108,025 | 39,253 | 208,167 | 2.75 |
| TUFLIN ™ HS-7028, available from The Dow Chemical Company (Midland, MI) | 128,523 | 30,442 | 377,083 | 4.22 |
| DOWLEX ™ 2045G, available from The Dow Chemical Company (Midland, MI) | 114,087 | 29,853 | 337,994 | 3.82 |
| DOWLEX ™ NG2045B, available from The Dow Chemical Company (Midland, MI) | 122,005 | 25,968 | 439,909 | 4.69 |
| PE Composition 1 | 119,321 | 39,179 | 330,184 | 3.05 |
| PE Composition 2 | 115,237 | 35,320 | 325,658 | 3.26 |

TABLE 1C

| Materials | Antioxidant | | | | Vinyl Groups |
|---|---|---|---|---|---|
| | I-1010* (ppm) | I-1076* (ppm) | I-168+ (ppm) | TNPP+ (ppm) | #/total 1000 Carbon Atoms |
| ENABLE ™ 35-05, available from ExxonMobil Chemical Company (Houston, TX) | — | 267 | — | 436 | 0.013 |
| EXCEED ™ 1018, available from ExxonMobil Chemical Company (Houston, TX) | — | 285 | — | 1356 | 0.070 |
| SCLAIR ™ FP120, available from Nova Chemicals Corporation (Calgary, Canada) | — | 777 | 498 | — | 0.404 |
| FLEXUS ™ 9212XP, available from Braskem S.A., (São Paulo, Brazil) | — | 758 | 486 | — | 0.090 |
| TUFLIN ™ HS-7028, available from The Dow Chemical Company (Midland, MI) | — | 217 | — | 737 | 0.098 |
| DOWLEX ™ 2045G, available from The Dow Chemical Company (Midland, MI) | 152 | 231 | 917 | — | 0.301 |
| DOWLEX ™ NG2045B, available from The Dow Chemical Company (Midland, MI) | — | — | ~1000 | — | 0.261 |
| PE Composition 1 | — | — | ~1000 | — | 0.186 |
| PE Composition 2 | — | — | ~1000 | — | 0.213 |

*IRGANOX ™ 1010 (I-1010) and IRGANOX ™ 1076 (I-1076) are primary antioxidants.
+IRGAFOS ™ 168 (I-168) and tris(nonylphenyl) phosphite (TNPP) are secondary antioxidants.

PE Composition 1 and 2

PE Composition 1 and 2 are prepared as follows: a multi-metal catalyst is prepared (Catalyst 1). Catalyst 1 is then used to prepare PE Composition 1 and 2 in a solution polymerization.

Catalyst 1 Preparation

To approximately 109 kg of 0.20 M $MgCl_2$ slurry was added 7.76 kg of EADC solution (15 wt % in heptanes), followed by agitation for 8 hours. A mixture of $TiCl_4NOCl_3$ (85 mL and 146 mL, respectively) was then added, followed by a solution of $Zr(TMHD)_4$ (0.320 kg of a 0.30 M solution in Isopar E). These two additions were performed sequentially within 1 hour of each other. The resulting catalyst premix was aged with agitation for an additional 8 h prior to use.

Production of PE Composition 1 and 2

PE Composition 1 and 2 are made according to the following procedures: All raw materials (monomer and comonomer) and the process solvent (a narrow boiling range high-purity isoparaffinic solvent, Isopar-E) are purified with molecular sieves before introduction into the reaction environment. Hydrogen is supplied pressurized as a high purity grade and is not further purified. The reactor monomer feed stream is pressurized via a mechanical compressor to above reaction pressure. The solvent and comonomer feed is pressurized via a pump to above reaction pressure. The individual catalyst components are manually batch diluted with purified solvent and pressured to above reaction pressure. All reaction feed flows are measured with mass flow meters and independently controlled with computer automated valve control systems.

A single reactor system is used. The continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to the reactor (solvent, monomer, comonomer, and hydrogen) is temperature controlled to maintain a single solution phase by passing the feed stream through a heat exchanger. The total fresh feed to the polymerization reactor is injected into the reactor at two locations with approximately equal reactor volumes between each injection location. The fresh feed is controlled with each injector receiving half of the total fresh feed mass flow. The catalyst components are injected into the polymerization reactor through injection stingers. The primary catalyst component feed is computer controlled to maintain the reactor monomer conversion at the specified targets. The cocatalyst component is fed based on calculated specified molar ratios to the primary catalyst component Immediately following each reactor feed injection location, the feed streams are mixed with the circulating polymerization reactor contents with static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a pump.

The reactor effluent enters a zone where it is deactivated with the addition of and reaction with a suitable reagent (water) and an acid neutralization component (calcium stearate) is also added. At this same reactor exit location other additives may be added for polymer stabilization (IRGAFOS™ 168).

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process. Table 2 summarizes the polymerization conditions for PE Composition 1 and 2.

TABLE 2

Reactor Data

| REACTOR FEEDS | | PE Composition 1 | PE Composition 2 |
|---|---|---|---|
| Reactor Configuration | Type | Single | Single |
| Comonomer type | Type | 1-hexene | 1-octene |
| Reactor Feed Solvent/ Ethylene Mass Flow Ratio | g/g | 3.9 | 3.1 |
| Reactor Feed Comonomer/ Ethylene Mass Flow Ratio | g/g | 0.09 | 0.60 |
| Reactor Feed Hydrogen/Ethylene Mass Flow Ratio | g/g | 8.5E−05 | 9.0E−05 |
| Reactor Temperature | °C. | 192 | 192 |
| Reactor Pressure | barg | 50 | 50 |
| Reactor Ethylene Conversion | % | 92.7 | 92.9 |
| Reactor Catalyst Type | | Catalyst 1 | Catalyst 1 |
| Reactor Co-Catalyst 1 Type | | tri-ethyl-aluminum (TEA) | tri-ethyl-aluminum (TEA) |
| Reactor Co-Catalyst 1 to Catalyst Molar Ratio (Al to Ti ratio) | Ratio | 10.0 | 11.4 |
| Reactor Residence Time | min | 5.5 | 6.3 |

TABLE 3

Free Radical Generator

| | | Half-Life at 220° C. (seconds) | Decomposition Energy (kJ/mol) | Molecular Weight (Daltons) | Peak Decomposition Temperature |
|---|---|---|---|---|---|
| FRG | 3,6,9-triethyl-3-6-9-trimethyl-1,4,7-triperoxonane (41% solution in isoparaffins), a cyclic peroxide, available | 82 | −835 | 264.3 | 208° C. |

TABLE 3-continued

| Free Radical Generator | | | |
|---|---|---|---|
| Half-Life at 220° C. (seconds) | Decomposition Energy (kJ/mol) | Molecular Weight (Daltons) | Peak Decomposition Temperature | from AkzoNobel N.V. (Netherlands) as TRIGONOX ™ 301

TABLE 4

| Polyethylene resin | | | | | |
|---|---|---|---|---|---|
| | | | Antioxidant | | |
| | Density (g/cm³) | Melt Index (g/10 min) | I-1010* (ppm) | I-1076* (ppm) | I-168+ (ppm) | TNPP+ (ppm) |
| LDPE 4016, available from The Dow Chemical Company (Midland, MI) | 0.920 | 16 | — | — | — | — |

TABLE 5

| Masterbatch Composition | |
|---|---|
| | Added amount of FKG/total amount of LDPE 4016 |
| MB | 1,000 ppm |

The masterbatch with a target peroxide concentration of 1,000 ppm was prepared by the imbibing method using a 20-liter Henschel mixer, which is a high speed mixer. First, a solution of TRIGONOX™ 301 in mineral oil (1:1) was prepared in a plastic mixing jug and gently shaken for 20-30 seconds. The LDPE 4016 pellets were loaded into the Henschel mixer, followed by addition of the diluted solution of TRIGONOX™ 301, making sure to evenly distribute it over the pellets. Then, the contents of the Henschel mixer were mixed for 60 seconds, and the mixture was discharged into an aluminum foil bag secured at the discharge valve of the mixer. The filled aluminum foil bag was sealed and stored until further use.

TABLE 6

| Formulations | | |
|---|---|---|
| | Base Resin | Masterbatch |
| Inventive 1 | 96 wt. % PE Composition 1 | 4 wt. % MB |
| Inventive 2 | 98 wt. % PE Composition 2 | 2 wt. % MB |
| Inventive 3 | 96 wt. % PE Composition 2 | 4 wt. % MB |
| Comparative A | 100 wt. % ENABLE ™ 35-05 | 0 wt. % MB |
| Comparative B | 90 wt. % PE Composition 1 + 10 wt. % AGILITY ™ 1021 | 0 wt. % MB |
| Comparative C | 100 wt. % PE Composition 2 | 0 wt. % MB |
| Comparative D | 90 wt. % PE Composition 2 + 10 wt. % AGILITY ™ 1021 | 0 wt. % MB |
| Comparative E | 80 wt. % PE Composition 2 + 20 wt. % AGILITY ™ 1021 | 0 wt. % MB |

Monolayer films were fabricated on a blown film extrusion line (die diameter: 8 in., die gap: 70 mil), equipped with a polyethylene Davis Standard Barrier II screw along with external cooling by an air ring and internal bubble cooling. Films were collected at a thickness of 2 mil, output rate of 300 lb/hr, and a blow-up ratio of 2.5. General blown film parameters, used to produce each blown film, are shown in Table 7A. The temperatures are those closest to the pellet hopper (Barrel 1), and in increasing order, as the polymer was extruded through the die.

TABLE 7A

| Blown film fabrication conditions for films. | |
|---|---|
| Blow up ratio (BUR) | 2.5 |
| Film thickness (mil) | 2.0 |
| Die gap (mil) | 70 |
| Rate (lb/hr) | 300 |
| Air temperature (° F.) | 45 |
| Temperature profile (° F.) | |
| Barrel 1 | 350 |
| Barrel 2 | 425 |
| Barrel 3 | 380 |
| Barrel 4 | 350 |
| Barrel 5 | 350 |
| Screen Temperature | 430 |
| Adapter | 430 |
| Block | 430 |
| Lower Die | 440 |
| Inner Die | 440 |
| Upper Die | 440 |

TABLE 7B

| Results | | | | | |
|---|---|---|---|---|---|
| | Melt Strength (cN) at 190° C. | Maximum Blown Film Output Rate (lb/hr) | Melt Index (I2) (g/10 min) 190° C., 2.16 kg | Viscosity at 0.1 rad/s ($\eta_{0.1}$) at 190° C. (Pa) | Viscosity ratio ($\eta_{0.1}/\eta_{100}$) at 190° C. |
| Inventive 1 | 10.2 | 455 | NM | 69,292 | 29 |
| Inventive 2 | 8.6 | 490 | 0.37 | 29,509 | 15 |
| Inventive 3 | 12.2 | 497 | NM | 59,792 | 28 |
| Comparative A | 4.5 | 425 | 0.51 | 26,438 | 17 |
| Comparative B | 7.1 | 430 | 0.81 | 9,598 | 5 |
| Comparative C | 3.2 | 330 | 0.92 | 8,396 | 5 |
| Comparative D | 7.2 | 414 | 0.77 | 9,709 | 6 |
| Comparative E | 9.8 | 415 | 1.12 | 10,113 | 7 |

NM = Not measured

TABLE 7C

| | Results | | | | | |
|---|---|---|---|---|---|---|
| | Dart Impact Resistance (g) | Puncture Resistance (ft · lb/in³) | MD Free Shrinkage, 140° C. (%) | CD Free Shrinkage, 140° C. (%) | MD Shrink Tension (psi) | CD Shrink Tension (psi) |
| Inventive 1 | 162 | 82 | 77 | 11 | 18.7 | 1.22 |
| Inventive 2 | 654 | 173 | 79 | −4.3 | 18.1 | 0.69 |
| Inventive 3 | 675 | 152 | 80 | 14.9 | 28.9 | 1.05 |
| Comparative A | 179 | 55 | 72 | 6 | 6.0 | 1.11 |
| Comparative B | 132 | 52 | 64 | −7 | 3.3 | 0.88 |
| Comparative C | 774 | 182 | 48 | −6.8 | 2.9 | 0.57 |
| Comparative D | 474 | 153 | 64 | −11.2 | 5.6 | 0.70 |
| Comparative E | 338 | 146 | 67 | −10.8 | 7.4 | 0.80 |

As shown in Table 7B, Inventive 1 has higher melt strength than Comparative A and Comparative B, which contains 10% of a high performance LDPE to achieve improved melt strength. The higher melt strength of Inventive 1 can translate to higher blown film output rate as well. Similarly, Inventive 2 and Inventive 3 have higher melt strength and blown film output rate as compared to Comparative C, Comparative D, and Comparative E, with the latter two compositions containing 10% and 20% of the same high performance LDPE to achieve improved melt strength. The inventive compositions also have significantly higher DMS viscosity ratio indicating improved shear thinning characteristics relative to the comparative compositions. One of the benefits of the inventive compositions, therefore, is that high melt strength and shear thinning properties (improved film processability) can be achieved without needing to add LDPE as a blend component.

Table 7C shows the final film properties of the Inventive and Comparative Compositions. Inventive 1 has higher puncture resistance than Comparative A and Comparative B. Inventive 2 and Inventive 3 have significantly higher dart impact and puncture resistance than Comparative D and Comparative E, respectively. Thus, the inventive compositions can achieve better retention of film toughness. Inventive 1 also has higher machine- and cross-direction shrinkage and shrink tension than Comparative A and Comparative B. Similarly, Inventives 2 and 3 have higher or comparable machine- and cross-direction shrinkage and shrink tension than Comparatives D and E.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

We claim:

1. A method for increasing the melt strength and/or low shear viscosity of a polyethylene resin, the method comprising:
   a) providing a polyethylene composition comprising the reaction product of ethylene and optionally, one or more alpha-olefin comonomers, wherein the polyethylene composition is characterized by the following properties: a density ranging from 0.900 g/cm³ to 0.970 g/cm³, a molecular weight distribution (Mw/Mn) ranging from 2.6 to 3.5, and from 0.10 to 0.27 vinyl groups per 1,000 total carbon atoms;
   b) providing a masterbatch composition comprising a free radical generator and a polyethylene resin, wherein the free radical generator has a half-life at 220° C. of less than 200 seconds, and a decomposition energy higher than −250 kJ/mol, and wherein the polyethylene resin has a density ranging from 0.900 g/cm³ to 0.970 g/cm³, melt index ranging from 0.01 g/10 min to 100 g/10 min; and
   c) reacting the polyethylene composition with the masterbatch composition to form a modified polyethylene composition.

2. The method of claim 1, wherein the amount of free radical generator is less than 50 ppm relative to the total amount of resin in the modified polyethylene composition.

3. The method of claim 1, wherein the free radical generator has a half-life at 220° C. of between 60 seconds and 120 seconds.

4. The method of claim 1, wherein the molecular weight of the free radical generator is from 200-1,000 Daltons.

5. The method of claim 1, wherein the free radical generator is a cyclic peroxide.

6. The method of claim 1, wherein the masterbatch composition comprises less than 150 ppm of primary antioxidant.

7. The method of claim 1, wherein the polyethylene composition comprises less than 150 ppm primary antioxidant.

8. The method of claim 1, wherein the polyethylene composition is further characterized by a melt flow ratio, I10/I2, of from 5.5 to 7.6.

9. The method of claim 1, wherein the polyethylene composition is further characterized by a composition distribution breadth index of less than 60%.

10. The method of claim 1, wherein the polyethylene composition is further characterized by a melt index, I2, of from 0.5 to 7 g/10 min.

11. The method of claim 1, wherein the polyethylene composition is formed in the presence of a catalyst composition comprising a multi-metallic procatalyst via solution polymerization in at least one reactor.

12. A film formed from the modified polyethylene composition of claim 1.

13. The film of claim 12, wherein the film is a blown film.

14. The film of claim 12, wherein the film is a multilayer film.

15. The film of claim 12, wherein the film is a monolayer film.

16. A blow molded article formed from the modified polyethylene composition of claim 1.

* * * * *